XR 3,654,500

[redacted]

United ! X 89 313√

Claiborne

[15] 3,654,500

[45] Apr. 4, 1972

[54] APPARATUS FOR CONVERTING BULK WAVES TO RAYLEIGH WAVES AT MICROWAVE FREQUENCIES

[72] Inventor: Lewis T. Claiborne, Dallas, Tex.

[73] Assignee: Texas Instruments Incorporated, Dallas, Tex.

[22] Filed: June 11, 1970

[21] Appl. No.: 45,453

[52] U.S. Cl. ..........310/8.3, 29/25.35, 333/30 R

[51] Int. Cl. ..........H01v 7/00

[58] Field of Search ..........310/8.2, 8.3, 8.5, 8.7; 333/30 R

[56] References Cited

UNITED STATES PATENTS

| | | | |
|---|---|---|---|
| 3,534,300 | 10/1970 | Jouffroy et al. | 310/8.2 X |
| 3,515,911 | 6/1970 | Byram et al. | 310/8.3 X |
| 3,409,848 | 11/1968 | Meitzler et al. | 333/30 X |
| 2,525,861 | 10/1950 | Carlin | 333/30 X |
| 3,254,317 | 5/1966 | Bauer | 333/30 |
| 3,070,761 | 12/1962 | Rankin | 333/30 |

*Primary Examiner*—J. D. Miller
*Assistant Examiner*—Mark O. Budd
*Attorney*—Harold Levine, James O. Dixon, Andrew M. Hassell, Melvin Sharp, John E. Vandigriff and William E. Hiller

[57] ABSTRACT

Chalcogenide glass is deposited on a nonpiezoelectric substrate by vapor deposition techniques to form thereon a wedge of chalcogenide glass, the sloping surface of the wedge being disposed at a preselected angle with the surface of the substrate. The interface between the substrate and the chalcogenide glass thus deposited is substantially free from defects that generate acoustical interference at high frequencies. A piezoelectric transducer is then evaporated onto the surface of the wedge. A microwave frequency signal applied to the transducer generates bulk waves in the chalcogenide glass wedge. These bulk waves propagate through the wedge and impinge the substrate at regularly spaced intervals, thereby generating Rayleigh (surface) waves in the substrate.

6 Claims, 4 Drawing Figures

INVENTOR
Lewis T. Claiborne
ATTORNEY

WITNESS
Richard L. Donaldson

Patented April 4, 1972 3,654,500

2 Sheets-Sheet 2

WITNESS

Richard L Donaldson

APPARATUS FOR CONVERTING BULK WAVES TO RAYLEIGH WAVES AT MICROWAVE FREQUENCIES

This invention relates generally to propagation of acoustical waves through a solid, and more particularly to methods and apparatus for converting from propagation by bulk waves to propagation by Rayleigh (surface) waves at microwave frequencies.

In general, acoustical waves may be propagated through a solid by three different modes of transmission; namely, compressional waves, shear waves, and surface or Rayleigh waves. Compressional waves and shear waves are commonly grouped together and called "bulk" waves, since these waves propagate through the "bulk" of the material. Surface waves, on the other hand, propagate only near the surface of the material. When a piezoelectric solid is utilized as the material, it is relatively easy and well known in the art to generate surface waves therein by applying a signal across electrodes attached thereto. When the solid is nonpiezoelectric, however, a different technique must be used to generate surface waves.

To date, surface waves have been generated in nonpiezoelectric solids by mode conversion; that is, bulk waves in a first material are converted into surface waves in a second material or substrate. This conversion is accomplished by using a wedge of a first material having a velocity of propagation of bulk waves that is slower than the velocity of propagation of surface waves in the second material. This requirement, as will be explained in detail hereinafter, is essential in order to achieve mode conversion. Apparatus for generating such surface waves are commonly referred to as "surface wave launchers."

It is also well known in the art to use wedges of a first material, as above described, in order to achieve mode conversion. For example, in the aircraft industry, mode conversion is used to detect flaws in the surface of a material, such as the wing of an airplane. Since surface waves are attenuated by surface flaws, cracks in the surface of an airplane wing are easily identified. In such applications, the material from which the wedge is fabricated is predominantly plastic, plastics being essentially the only materials to date having a sufficiently low velocity of bulk wave propagation and which may also be easily fabricated. The problem with using plastics, however, is the fact that they are not suitable for use in surface wave launchers where frequencies above 10 megacycles are required. This is due to two causes: first, the plastic itself has a very high propagation loss at high frequencies, and secondly, a material such as glue or a film of oil must be used to bond the wedge of plastic to the surface of the substrate. This bond is itself at least 1—10 microns in thickness. At high frequencies this thickness corresponds with the wave length being propagated and causes substantial acoustical interference. This severely limits use of surface waves, as for example, in tapped delay line devices for signal correlation functions and other signal processing applications.

In mode conversion, as above described, a transducer is required to be attached to the sloping surface of the wedge in order to generate bulk waves therein. Thus, it may be seen that a second bonding is required to be made with the wedge material; that is, the transducer itself must be bonded to the surface of the wedge. It is well known in the art, however, that a thin surface of metal may be deposited on the surface of the wedge and a thin epitaxial film of piezoelectric material, such as cadmium sulfide, deposited thereon. This epitaxial film serves as the transducer, and since it has been evaporated onto the surface of the wedge, the bond between the two materials introduces very little acoustical interference. This method of bonding the transducer to the wedge is known to the art and does not form a part of the present invention.

Accordingly, it is an object of the present invention to provide methods and apparatus for converting bulk waves to surface waves at microwave frequencies.

A feature of the present invention relates to using, for the wedge, a chalcogenide glass defined by the formula $GE_{28}Se_{60}As_{12}$ wherein the subscripts define the relative atomic percentages of the respective elements. This glass has the unique qualities of both propagating bulk waves at a very low velocity with low attenuation and of being suitable for vapor deposition techniques.

Briefly, and in accordance with the present invention, methods and apparatus are disclosed for converting propagation by bulk waves to propagation by surface waves. A layer of chalcogenide glass is deposited by vapor deposition techniques on a substrate. A surface of the layer of glass is lapped and polished to form a wedge, the sloping surface thereof being disposed at a preselected angle to the surface of the substrate. A transducer comprising an epitaxial piezoelectric film is then formed on the sloping surface of the wedge. Thus, when a microwave frequency signal is applied to the transducer, bulk waves are propagated through the wedge material in a direction perpendicular to the sloping surface of the wedge. These bulk waves strike the surface of the substrate at regularly spaced intervals corresponding to the velocity of propagation of surface waves in the substrate material and thereby generate surface waves therein.

The novel features believed to be characteristic of this invention are set forth in the appended claims. The invention itself, however, as well as other objects and advantages thereof may best be understood by reference to the following detailed description of illustrative embodiments when read in conjunction with the accompanying drawings in which identical designations in all of the figures refer to identical parts, and in which:

Figure 1:
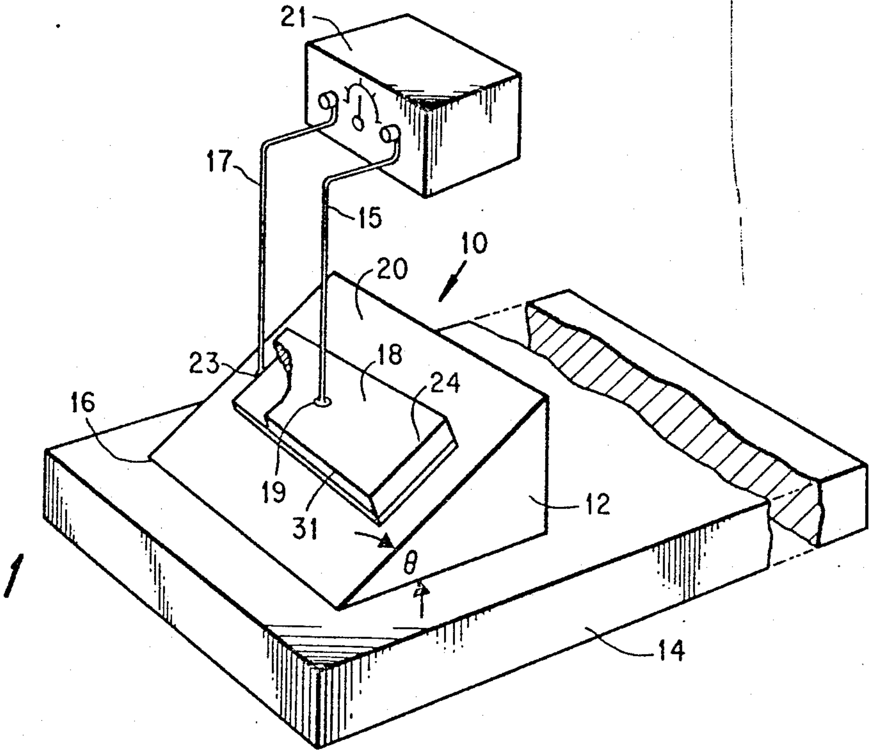
FIG. 1 is a perspective view of a surface wave launcher in accordance with the present invention.
Figure 2:
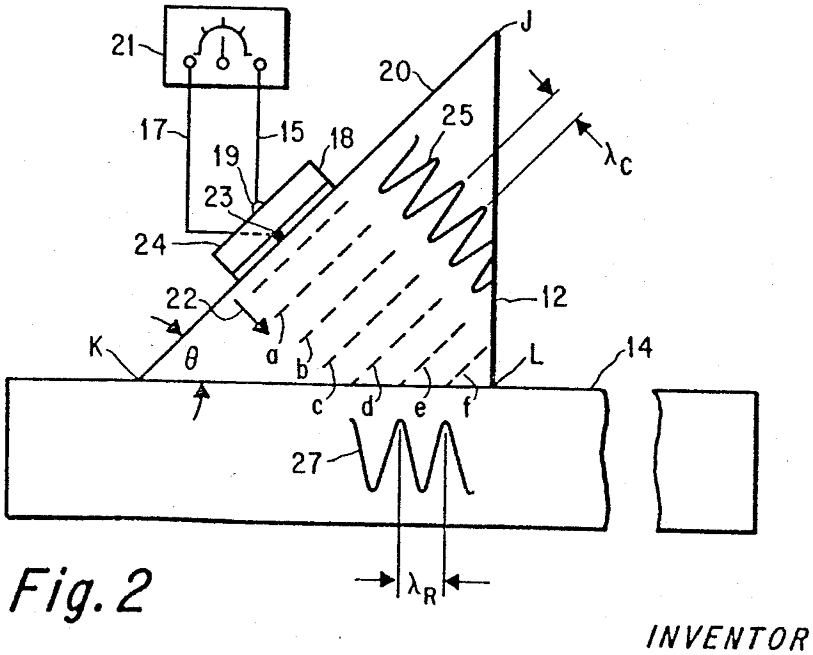
FIG. 2 is a side view of FIG. 1, diagramatically depicting compressional waves and surface waves generated by the operation of the present invention.

Referring now to the drawings and particularly to FIGS. 1 and 2 for the present, a surface wave launcher is designated generally at 10. The surface wave launcher comprises a substrate 14 onto which a wedge of material 12 has been attached such that the interface 16 between the substrate and the wedge is substantially free from acoustical interference at microwave frequencies. A transducer 18 is then epitaxially deposited on the sloping surface 20 of the wedge 12.

The substrate 14 may be of any solid material suitable for propagation of surface waves, and may be either polycrystalline or monocrystalline in structure. In the preferred embodiment, the substrate 14 is fabricated from nonpiezoelectric material, although using such a material is in no way critical for operation of the present invention. Preferably, the substrate 14 is monocrystalline silicon, but monocrystalline germanium is also suitable.

The wedge 12 comprises a material that may be formed by vapor deposition techniques and which has a very low bulk wave propagation velocity ($V_B$). As is understood by those skilled in the art, conversion from bulk wave propagation to surface wave propagation may be accomplished when the velocity of bulk wave propagation is less than the velocity of surface wave propagation in the substrate material. Specifically, the conditions under which such conversion may occur are when the surface 20 of the wedge forms an angle $\theta$ with the substrate surface, such angle being defined by $\theta = \text{Sin}^{-1} V_B/V_R$ where $V_B$ is the velocity of bulk wave propagation in the wedge material 12, and $V_R$ is the velocity of surface wave propagation in the substrate 14. Since the sine of an angle is one or less, it may be seen that $V_B$ must be less than $V_R$ to achieve conversion from bulk wave propagation to surface wave propagation. This requirement accounts for part of the difficulty in achieving mode conversion, in that it is well known in the art that the velocity of bulk wave propagation for most solid materials is significantly greater than the velocity of surface wave propagation in most of the substrate materials of interest. Only a limited number of solid materials have a velocity of bulk wave propagation sufficiently low enough to permit their use as the wedge material in a surface wave launcher. In fact, referring to Mason, *Physical Acoustics and the Properties of Solids*, published in 1958 by V. Van Nostrand Company Inc., it may be seen from the table at page 17 therein (listing the velocity of propagation of bulk waves of various materials) that plastics are essentially the only easily fabricated materials having a $V_C$ (compressional wave velocity) less than about 3,000 meters per second, which is the maximum velocity of the surface wave velocity in most substrate materials. Materials other than plastics having a low $V_C$ are, for the most part, very soft and very difficult to work with.

The second requirement of the wedge is material 12 is that it be compatible with fabrication of vapor deposition techniques. This is important and critical to the present invention, since the interface 16 between the wedge 12 and the substrate 14 must be substantially free from acoustical interference at high frequencies. It has been discovered that forming the wedge by vapor deposition techniques provides such an interface.

While any material having a $V_B$ less than the $V_R$ of the substrate 14, and which may be deposited by vapor deposition, is acceptable for the wedge material 12, and the material preferably used for the wedge 12 in the present invention is chalcogenide glass defined by the formula $Ge_{28}Se_{60}As_{12}$ wherein the subscripts refer to the atomic percentage of the respective elements. This material and the method for making it are described in U.S. Pat. No. 3,360,649 issued Dec. 26, 1967, and assigned to the assignee of the present application.

In fabricating the wedge 12, a layer of the wedge material is deposited on the substrate 14 by vapor deposition or vapor transport techniques. The surface of the layer of wedge material is then lapped and polished to form the wedge 12, the sloping surface 20 of which forms a preselected angle $\theta$, as previously defined, with the substrate 14.

The piezoelectric transducer 18 may comprise any epitaxial piezoelectric film; preferably, it is made of cadmium sulfide. Methods for securing the transducer 18 to the wedge surface 20 in a substantially acoustic interference-free manner are known to the art and are not a subject of the present invention. One such method is described in "Ultra High Frequency CdS Transducers," by N. F. Foster, page 63, IEEE Transactions on Sonics and Ultrasonics, November 1964.

Operation of the present invention will now be described. Again, with reference to FIGS. 1 and 2, a microwave signal from any suitable source 21 is applied to the piezoelectric transducer 18 at contacts 19 and 23 (FIG. 2) by conductors 15 and 16 respectively, thereby generating compressional waves in the wedge 12. As explained in the previously referenced article by Foster, contact 23 is formed by evaporating a thin film of metal onto the substrate. The transducer 18 is then deposited and contact 19 is formed thereover. While either "shear" or "compressional" waves may be utilized in accordance with the present invention, the latter are preferably used and are referred to hereinafter in describing operation of the invention. These compressional waves propagate through the wedge material with a velocity $V_C$, having a wave length $\lambda_C$ defined by $\lambda_C = V_C/F$, wherein F is the frequency of the compressional waves. Referring specifically to FIG. 2, the compressional waves propagate through the wedge 12 in the direction indicated by arrow 22. As may be seen, the waves propagate in a direction perpendicular to the surface 20 of the wedge. Dashed lines *a*, *b*, and *c* represent successive wave fronts of the compressional wave, a typical compressional wave being shown at 25. The distance between successive wave fronts, points "*b*" and "*c*," for example, is the wave length $\lambda_C$ of the compressional waves.

As may also be seen from FIG. 2, the compressional waves *a*, *b*, and *c* propagate in an "acoustic beam." That is, the compressional waves generated by the transducer 18 diverge very little as they travel through the wedge 12. Some divergence, however, does occur and preferably, therefore, the width 24 of the transducer 18 is substantially less than the length 31 in order to minimize the distortion effects of divergence.

Again with reference to FIG. 2, it may be seen that as the compressional waves propagate through the wedge 12 in the direction indicated by arrow 22, compressional wave fronts *a*, *b*, and *c*, for example, periodically strike the surface of the substrate 14 at points *d*, *e*, and *f*, respectively. A surface wave will be generated at the surface of substrate 14 when the distance between points *d* and *e*, or between points *e* and *f*, is equal to the wave length $\lambda_R$ of the surface wave that may be propagated through substrate 14. In this respect, the angle $\theta$, shown as J-K-L is critical. In order to achieve conversion from compressional waves to surface waves, the angle $\theta$ that the surface 20 of the wedge 12 makes with the substrate 14 must satisfy the equation $\theta = \sin^{-1}\lambda_C/\lambda_R$ where $\lambda_C$ represents the wave length of the compressional wave, as for example the distance between points *a* and *b*, and where $\lambda_R$ represents the wave length of the surface wave, as for example the distance between points *e* and *f*. Since $\lambda_C = V_C/F$ and $\lambda_R = V_R/F$, it may be seen that $\theta = \sin^{-1}V_C/V_R$. A typical surface wave produced as above described is indicated at 27.

Thus, in operation, the $V_R$ of the material used for the substrate 14 would be determined. Knowing the $V_C$ of the material used for the wedge 12, the angle $\theta$ may be calculated from the formula $\theta = \sin^{-1}V_C/V_R$. A layer of the wedge material is then deposited by vapor deposition upon the substrate 14 and a surface of the layer lapped and polished to form the previously calculated angle $\theta$ with the substrate 14. A suitable piezoelectric transducer 18 is then formed on the surface 20 of the wedge 12. A microwave frequency signal is introduced at the transducer 18 by a suitable signal source 21, and compressional waves periodically strike the surface 14 of the substrate at the requisite intervals in order to generate surface waves in the substrate 14, thereby accomplishing conversion from compressional wave propagation to surface wave propagation.

Figure 3:
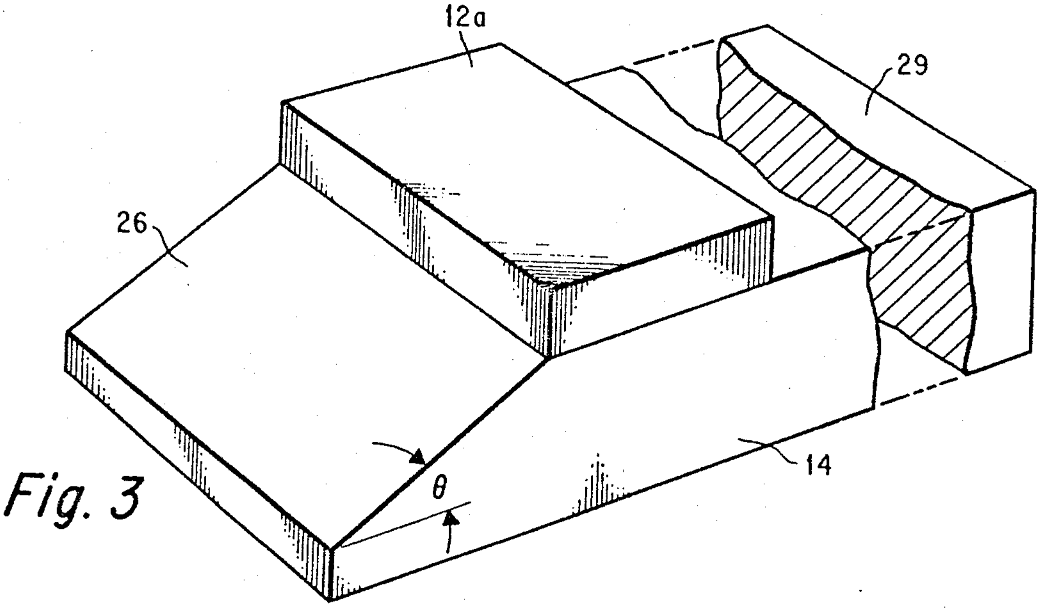
FIG. 3 is a perspective view of apparatus used with the present invention depicting an alternate arrangement of the substrate and showing a layer of wedge material having already been deposited on the substrate.
Figure 4:
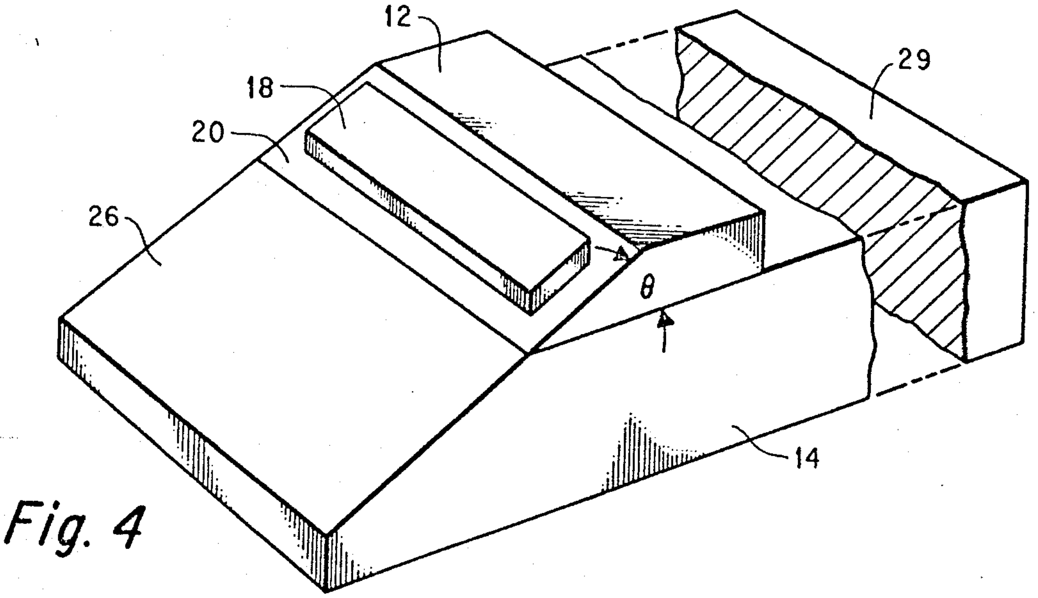
FIG. 4 is a perspective view depicting a completed surface wave launcher fabricated in accordance with the alternate arrangement of the substrate shown in FIG. 3.

An alternate method, and the one preferred in the present invention, for forming the wedge 12 on the substrate 14 is shown in FIGS. 3 and 4. A surface 26 of the substrate 14 is prepared so that it forms a predetermined angle $\theta$ with the surface 29 of the substrate 14. This angle $\theta$ is defined, as previously explained, as $\theta = \sin^{-1}V_C/V_R$. The surface 26 of the substrate 14 and the portion of the surface 29 in which it is not desired to deposit the wedge material 12*a* are masked with any suitable masking material known in the art. A layer 12*a* of wedge material is then formed by vapor deposition at the surface 29 of the substrate 14 adjacent the prepared surface 26. After the layer 12 of wedge material is deposited to suitable thickness, for example in the general range of 100 microns or more when the wedge material is $Ge_{28}Se_{60}As_{12}$, it is polished to have a surface 20 that lies in the same plane as surface 26. That is, surface 26 is used as a reference plane to facilitate polishing the wedge material so as to have a surface 20 with the desired angle of slope. A transducer 18 is then formed on the surface 20 of the wedge 12 thus completing fabrication of the surface wave launcher.

Although the present invention has been described with a certain degree of particularity, it is understood that the present disclosure is made by way of example and not by way of limitation and that numerous changes in the details of construction and the combination of parts may be resorted to without departing from the spirit and scope of the invention.

I claim:

1. A surface wave launcher for converting bulk wave propagation to surface wave propagation, comprising:
   a. a substrate capable of propagating surface waves;
   b. a wedge of chalcogenide glass deposited on said substrate to form an interface therebetween that is relatively free from acoustical interference, said wedge of material having a velocity of bulk wave propagation that is lower than the velocity of surface wave propagation of said substrate, and the sloping surface of said wedge of material forming a predetermined angle $\theta$ with the surface of said substrate, said angle satisfying the equation $\theta = \text{Sin}^{-1} V_B/V_R$, where $V_B$ is the velocity of propagation of bulk waves in said wedge, and $V_R$ is the velocity of propagation of surface waves in said substrate; and c. a transducer for receiving signals of a preselected frequency, said transducer being secured to the sloping surface of said wedge of material and forming an interface with the surface of said substrate that is relatively free from acoustical interference, whereby a signal applied to said transducer generates bulk waves in said wedge of material, which bulk waves, upon striking the surface of said substrate, are converted into surface waves therein.

2. The system according to claim 1 ti said bulk waves are compressional waves, said substrate is nonpiezoelectric, and said wedge of material is a chalcogenide glass defined by $Ge_{28}Se_{60}As_{12}$, wherein the subscripts refer to the atomic percentages of the respective elements.

3. The system in accordance with claim 2 wherein said substrate is monocrystalline silicon.

4. The system in accordance with claim 2 wherein said substrate is monocrystalline germanium.

5. The system in accordance with claim 3 wherein said transducer is cadmium sulfide.

6. The system in accordance with claim 5 wherein said frequency is within the microwave range.

* * * * *